Nov. 6, 1956     A. W. HANSON     2,769,804
CONTINUOUS METHOD FOR MAKING SOLID POLYMERIC MATERIALS
Filed Sept. 10, 1951     2 Sheets-Sheet 1

INVENTOR
Alden W. Hanson

BY
Griswold & Burdick
ATTORNEYS.

Nov. 6, 1956  A. W. HANSON  2,769,804
CONTINUOUS METHOD FOR MAKING SOLID POLYMERIC MATERIALS
Filed Sept. 10, 1951  2 Sheets-Sheet 2

INVENTOR
Alden W. Hanson

BY
Griswold & Burdick
ATTORNEYS

United States Patent Office 2,769,804
Patented Nov. 6, 1956

2,769,804

CONTINUOUS METHOD FOR MAKING SOLID POLYMERIC MATERIALS

Alden W. Hanson, Midland, Mich., assignor to The Dow Chemical Company, Midland, Mich., a corporation of Delaware Application September 10, 1951, Serial No. 245,834

13 Claims. (Cl. 260—86.7)

This invention concerns an improved method for the production, in a continuous manner, of solid, moldable polymers and copolymers of vinylidene compounds, particularly of monovinyl aromatic compounds. The method is one which may be applied in making solid thermoplastic polymers and copolymers which are of exceptionally uniform molecular weight and which therefore possess useful properties that are not shared to a like extent by polymeric materials made from the same starting materials by a batchwise polymerization method. The method may also be applied in making solid, moldable copolymers of vinylidene compounds chemically combined in predetermined proportions which do not vary greatly throughout a body of the same. In this sense, these copolymers are of exceptionally homogeneous chemical composition. The method permits ready production of a solid copolymer of such homogeneous and predetermined chemical composition either in a form of exceptionally uniform, or of non-uniform, molecular weight, as desired. The invention pertains especially to the production of solid, moldable copolymers of a mono-alkenyl aromatic compound having the general formula:

wherein Ar represents an aromatic hydrocarbon radical or a halogenated aromatic hydrocarbon radical and X is a member of the group consisting of hydrogen and lower alkyl radicals containing less than three carbon atoms, with other copolymerizable olefinic compounds, particularly vinylidene compounds. It pertains more particularly to the production of solid moldable copolymers of two or more monoalkenyl aromatic compounds, having the above general formula, chemically combined with one another in predetermined proportions.

The solid polymeric and copolymeric products from the method are of fairly high molecular weight, e. g. they have molecular weights of 5,000 or higher, and are adapted to the manufacture of molded articles. For use in a molding operation, particularly an injection molding operation, the uniformity in chemical composition and molecular weight of a polymeric material is of considerable importance. The solid homopolymers obtained by conventional polymerization methods usually comprise polymer molecules of widely varying molecular weights, and the solid copolymers made by known methods usually vary widely both in chemical composition and in molecular weight throughout a body of the same. Such usual polymeric materials, i. e. both the homopolymers and the copolymers, are thermoplastic and, when heated, soften and may be molded at temperatures far below those at which they become truly liquid. However, for ease of molding and to assure complete filling of a mold, the polymeric materials are usually heated to temperatures aproximating, or at least approaching, the liquefying temperature, particularly during molding by an injection molding procedure. It is then necessary to cool the material in the mold to harden the same in order to prevent marring during ejection of the molded article from the mold. The cooling time required limits the rate of production and adds to the cost of manufacture. However, the difference between the softening point and liquefying temperature of a thermoplastic polymer of a given average molecular weight becomes less as the polymeric material is rendered more nearly homogeneous in chemical composition or in molecular weight. A decrease in the difference between such temperatures permits more rapid cooling and hardening of molded articles and, consequently, an increase in rate of molding. The mechanical properties of copolymers frequently, but not always, improve as the copolymers are rendered more nearly homogeneous in chemical composition or in a molecular weight.

It has long been known that during the copolymerization of two or more vinylidene compounds, the composition of the copolymer being formed usually changes as the reaction progresses so that the final product is a mixture of a number of copolymers of the starting materials chemically combined in varying proportions, and not a single copolymer of uniform composition throughout. This is due, in part to the fact that the vinylidene compounds usually combine with one another in proportions different from the relative proportions of the monomers present, and the resultant changes in relative proportions of the remaining monomeric materials in the polymerization mixture, which occur during a polymerization. For instance, during the polymerization, e. g. en masse, in solution, or in an aqueous emulsion or suspension, of an equimolecular mixture of vinyl chloride and vinylidene chloride, the latter polymerizes most rapidly. Accordingly, the polymeric material formed in early stages of the reaction contains vinylidene chloride as the principal chemically combined component and that formed toward the completion of the reaction contains vinyl chloride as its principal component.

It is also known that it is difficult, by usual polymerization procedures, to homopolymerize, or copolymerize, vinylidene compounds to obtain a polymeric product of uniform molecular weight throughout, since the molecular weight of a polymer being formed is dependent on each of a number of variable polymerization conditions, such as temperature, concentration of monomeric starting material in the polymerization mixture, and concentration of catalyst, if present, etc., and one or more of such conditions usually change during a polymerization. As a result, the final polymeric product is usually a mixture of polymer molecules of widely varying molecular weights, and the molecular weight expressed for the product is merely an average value for the polymers present. This is particularly true for polymerization reactions which are carried out en masse. During the polymerization or copolymerization of vinylidene compounds such as styrene, or methylmethacrylate, etc., en masse, i. e. in the absence of liquid diluents, heat generated by the exothermic polymerization reaction cannot readily escape, or be withdrawn, to maintain a truly constant temperature since the mixture itself is a poor conductor of heat. The resultant temperature changes cause variations in the molecular weight of the polymeric material being formed. Also, as such mass polymerization is continued in a batch-wise manner, monomeric material is consumed and the concentration of the same decreases. This tends to cause a decrease in the molecular weight of the polymer being formed. Polymeric materials prepared by batchwise polymerizations in other usual ways, e. g. in aqueous emulsion, or aqueous suspension, or while dissolved in an inert organic liquid, have also been mixtures of polymer molecules of varying molecular weights, but the range of molecular weight variation is usually less for a product made in such way than for the corresponding product prepared by a polymerization en masse.

Since the properties of polymeric materials are dependent to a considerable extent upon the composition and molecular weight of the same, it is evident that certain of the polymeric components formed during a polymerization in the conventional ways just mentioned are better suited than others for a particular purpose, and that it would be advantageous to avoid formation of the less desirable polymeric components usually present in the products.

Several methods have been suggested in the art for copolymerizing vinylidene compounds in aqueous emulsion or aqueous suspension to obtain copolymers of uniform chemical composition, i. e. containing a single ratio of the chemically combined starting materials, throughout a body of the product. U. S. Patent No. 2,100,900 teaches that such homogeneous copolymer may be obtained by adding, to the emulsified copolymerization mixture, the vinylidene compound which polymerizes most rapidly, at the rate at which said compound copolymerizes with the less rapidly polymerizable compound. U. S. Patent 2,482,771 teaches that substantially homogeneous copolymers may be obtained by carrying out a copolymerization, e. g. of vinyl chloride and vinylidene chloride, under pressure in aqueous suspension and during the reaction bleeding the slower reacting monomer from the system at a rate which prevents the pressure from exceeding a pressure corresponding to that of the selected mixture of monomers to be copolymerized. However, the examples of the patent show that the copolymeric products, although homogeneous, did not have compositions corresponding to the relative proportions in which the monomeric starting materials were employed. U. S. Patent 2,496,384 teaches that a homogeneous copolymer may be obtained by feeding into an aqueous emulsified polymerization system two or more vinylidene compounds in the relative proportions in which they react together to form a coplymer and discontinuing the polymerization reaction when the feed of monomers is stopped.

Each of the known methods just described is troublesome to carry out and involves inherent disadvantages. For instance, the relative rates at which a pair of vinylidene compounds copolymerize with one another seldom corresponds to their relative rates of undergoing homopolymerization reactions under otherwise similar polymerization conditions. Accordingly, the rates of feed of monomeric material which are required in the first and last of said methods must be determined experimentally aforehand for each polymerization mixture and each set of polymerization conditions to be employed. Also, said methods are limited to formation of copolymers having the compositions naturally resulting from the relative reaction rates of the monomeric starting materials, i. e. they do not permit predetermined control of the composition of the copolymeric product so that any of several copolymers may be prepared at will from a given set of monomeric starting materials. Also, all of said methods for making substantially homogeneous copolymers are limited to copolymerization reactions that are carried out in an aqueous medium, i. e. using an aqueous emulsion or suspension of the polymerizable starting materials. To the best of my knowledge, no solid, moldable copolymer of vinylidene compounds chemically combined in uniform proportions has heretofore been produced by a mass polymerization procedure.

It is an object of this invention to provide an improved method for the polymerization of vinylidene compounds. A particular object is to provide such method which permits production of a solid polymeric material which is of exceptionally uniform molecular weight, i. e. which is composed principally of polymer molecules having a narrow range of molecular weights. Another object is to provide an improved method for copolymerizing vinylidene compounds with one another, or with other polymerizable olefinic compounds, which permits ready production in a continuous manner of solid, moldable copolymers having desired, and predetermined, compositions and which are of exceptionally uniform chemical composition throughout a body of the same. A further object is to provide such a method whereby two or more readily polymerizable olefinic compounds, including at least one alkenyl aromatic compound of the aforementioned general formula, may be copolymerized en masse in any of a range of proportions to obtain a solid, moldable copolymer of predetermined composition which is substantially uniform, both in chemical composition and in molecular weight, throughout a body of the same. Other objects will be evident from the following description of the invention.

I have discovered an improved method for the polymerization of vinylidene compounds which permits ready accomplishment of any or all of the foregoing objectives, as desired. The method involves continuous feed of one or more polymerizable monomeric vinylidene compounds to a polymerization zone containing a relatively large body of material undergoing polymerization, stirring or otherwise agitating the polymerization mixture so as to cause rapid distribution of the inflowing monomeric material, continuously withdrawing a stream of the polymerization mixture, which comprises a solution of the monomer and polymer with one another, and vaporizing unreacted monomeric material therefrom to obtain the polymeric product as a residue, and continuously returning directly to the polymerization zone the monomeric material thus vaporized from the polymeric product.

It is important, for attainment of each of the aforementioned objectives, that the process be carried out in a continuous manner, that the mixture in the polymerization zone be incompletely polymerized, e. g. between 5 and 95 per cent polymerized, at a time well after starting operation of the process; and that escape, or withdrawal, of monomeric material from the polymerization system (which system includes zones for vaporizing monomeric material from the polymer and returning the monomeric material to the polymerization zone) be avoided as nearly as possible. It is also desirable, for production of a polymeric product which is rich in polymer molecules of close to the same molecular weight, that the polymerization be carried out at as nearly a constant temperature as possible, i. e. that 80 percent of the polymerization or more be accomplished at temperatures within a 5° C. range and preferably within a temperature range of 3° C. or less. It is, of course, difficult to avoid occurrence of large temperature changes in the steps of vaporizing monomer from the polymeric product and returning the recovered monomer to the polymerization zone. However, little, if any, of the polymerization occurs during these steps, hence, they do not interfere seriously with production of a polymeric material composed principally of polymer molecules having molecular weights within a narrow range.

There are instances, in which a polymeric product is desired that is not of uniform molecular weight, but which is composed of polymer molecules of different, predetermined molecular weights in predetermined relative proportions. The method of the invention may be modified, as hereinafter explained, to produce such polymeric products.

During the earlier stages of continuous operation, as set forth above (using a constant rate of feed of monomeric material to the polymerization system; a corresponding rate, on a weight basis, of withdrawal of polymeric product from the system; and a substantially constant polymerization temperature) the proportion of polymer in the system, e. g. in the polymerization zone, usually changes until a condition of balance is reached, after which the proportion of polymer in the mixture at a given point within the polymerization zone remains substantially constant. Since the molecular weight, and in the production of copolymers the chemical composition, of a polymeric material being formed often vary with change in the relative proportions of monomeric and polymeric materials in the polymerization mixture, the polymeric material produced during the earlier stages of operation usually varies from one time to another in molecular weight and, if the product is a copolymer, in chemical composition. However, as the system approaches the above-mentioned condition of balance, such variations in the product being produced become smaller. The extent of such variations in the polymer produced in early stages of the process, and the time of operation required to reduce them to a point at which they become inconsequential may be reduced by initially charging the reaction zone with a partially polymerized mixture having a composition approximating that present in the system when the latter is in balance.

Figure 2:
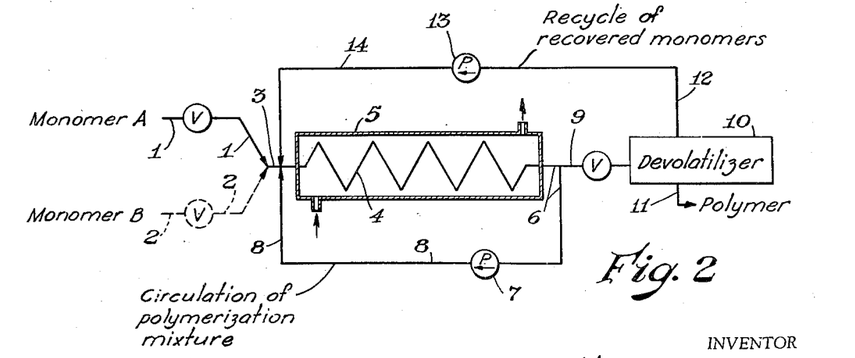
Figure 3:
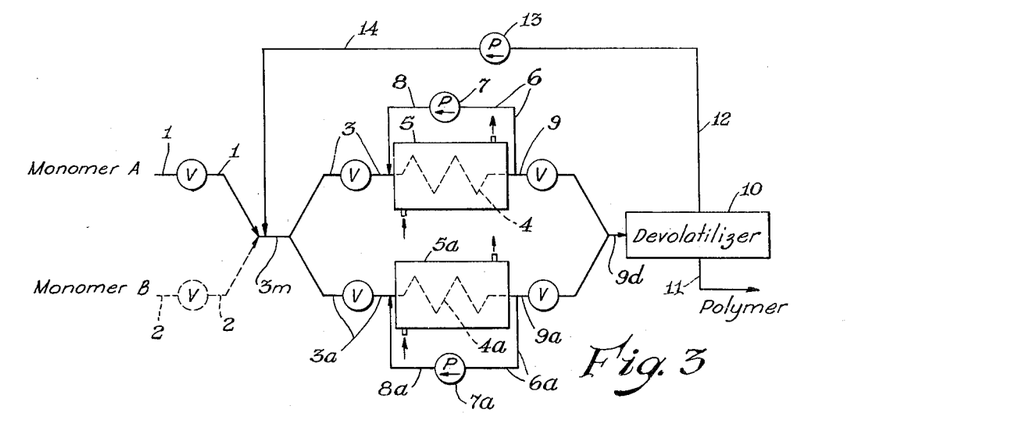
Figure 4:
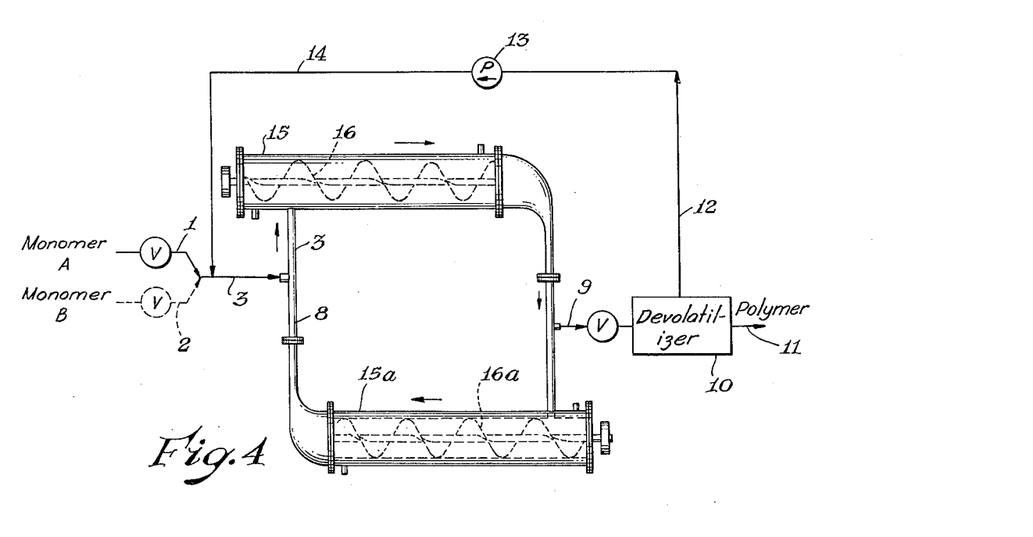

The procedure and apparatus to be employed in practice of the invention may be varied widely. For instance, the polymerization may be carried out in a pot type of vessel provided with a mechanical stirrer and with means for feeding monomeric material to the vessel, means for withdrawing a stream of the polymerization mixture from the vessel, and means for vaporizing monomeric material from the effluent stream and returning the recovered monomers to the polymerization vessel. Such an apparatus is shown schematically in Fig. 1 of the accompanying drawing. The method is usually practiced using a circulatory polymerization system comprising one or more feed inlets for monomeric material, a polymerization zone, means for withdrawing the polymerization mixture from the polymerization zone at a point remote from the point of feed of monomers to said zone and returning it to the polymerization zone at a point where it will mix readily and rapidly with the inflowing monomeric material, means for withdrawing a stream of the polymerization mixture at another point remote from the point of feed of monomer to the system, means for vaporizing and recovering monomeric material from the last mentioned stream, and means for continuously returning the recovered monomeric material to the polymerization zone. Such circulatory systems are shown schematically in Figs. 2–4 of the drawing. Figs. 2 and 3 illustrate arrangements of apparatus which may be used when the polymerization mixture is to be maintained in a liquid, or heat-plastified, condition permitting it to be pumped under pressure through pipe lines. The apparatus of Fig. 2 is adapted to the production of a polymer or copolymer which is substantially uniform in molecular weight and/or chemical composition. The apparatus of Fig. 3 is adapted to the production of polymeric material which is of a substantially uniform chemical composition, but which comprises polymer molecules of different molecular weights. The apparatus of Fig. 4 is similar to that of Fig. 2 except that it employs extrusion devices, provided with feed worms, for causing circulation of the polymerization mixture. The apparatus of Fig. 4 may be used in instances in which the polymerization mixture is too thick, or viscous, for convenient pumping with ordinary pumps.

Figure 1:
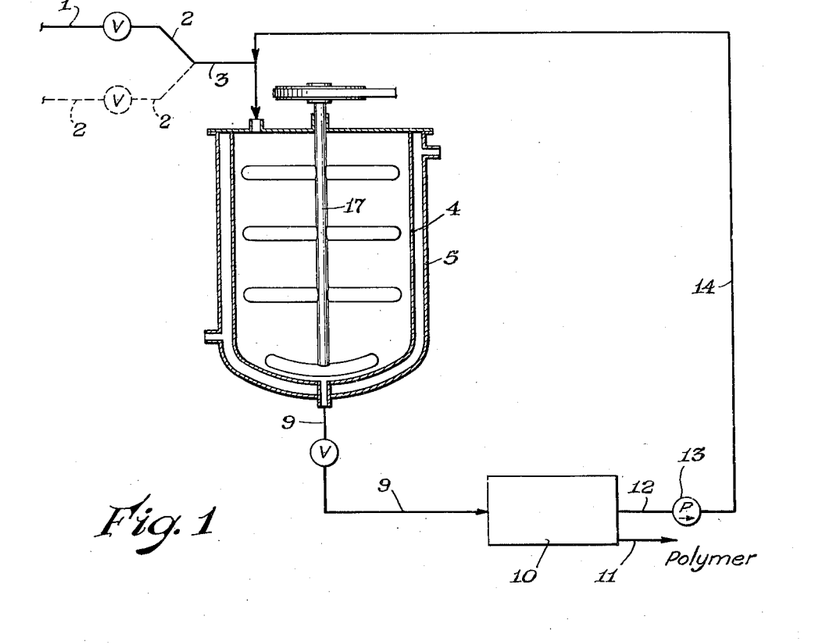

In Fig. 1, the numerals 1 and 2 designate valved inlets for two different monomers, A and B respectively. Inlet 2 is shown by a dotted line since it is used in making a copolymer, but is not used when making a homopolymer. Inlets 1 and 2 connect with a common line 3 leading to a polymerization vessel 4. The vessel 4 is surrounded by a jacket 5 having an inlet and outlet for passage of a temperature control fluid therethrough. The vessel 4 is provided with a mechanical stirrer 17. A valved line 9 leads from a lower section of vessel 4 and connects with a devolatilizer 10, which may be any of the devices known in the art for the continuous vaporization and removal of volatile components from thermoplastic resins, e. g. it may be a vacuum chamber through which thin streams of heated thermoplastic material pass, or a set of rolls for milling the heated polymer inside of a vacuum chamber, etc. The devolatilizer 10 is provided with usual means, not shown, such as a gear pump or the like, for discharging the residual heat-plastified polymer from the devolatilizer through the outlet 11. A vapor line 12, leads from the devolatilizer 10 to a pump 13 which serves to compress the vapors and cause return of the recovered volatiles, e. g. monomeric material, preferably in liquid condition, through line 14 which leads from pump 13 and connects with line 3. In all figures of the drawing, corresponding parts are similarly numbered.

In Fig. 2, the valved inlet lines 1 and 2 (line 2 being dotted since it is used only when making a copolymer) connect with a common line 3 which is an extension of a tubular polymerizer, e. g. a tubular autoclave, numbered 4. The tubular polymerizer, 4, which is usually a coil of pipe, is surrounded by a temperature control jacket, 5. At its effluent end, polymerizer 4 connects with a line 6, which, in turn, connects with a pump 7. A line 8, leading from pump 7, connects with line 3. A valved line 9 branches from line 6 and connects with a devolatilizer 10. The devolatilizer 10 is provided with a polymer outlet line 11 and also with a vapor line 12 which leads to a pump 13 that is, in turn, connected by a line 14 with line 3. These last mentioned parts of the apparatus of Fig. 2 are similar to those described with reference to Fig. 1. It will be noted that the apparatus of Fig. 2 includes two circuits, i. e. a circuit represented by the lines 4, 6, pump 7 and lines 8 and 3 and another represented by lines 4, 6, devolatilizer 10, line 12, pump 13 and lines 14 and 3, whereas the apparatus of Fig. 1 includes only the latter circuit.

The apparatus of Fig. 3 is similar to that of Fig. 2, except that it includes two polymerizers, 4 and 4a, arranged in parallel, and each provided with means for recycling a major portion of the polymerization mixture flowing through the same while withdrawing and blending together minor portions of the polymerization mixtures and passing the blended material to a devolatilizer. More specifically, in Fig. 3 the valved inlet lines 1 and 2 lead to a line 3m where the monomers are mixed together. Line 3m branches into valved lines 3 and 3a which connect with the polymerizers 4 and 4a, respectively. The polymerizers 4 and 4a are inside the respective temperature control chambers 5 and 5a. At its effluent end, polymerizer 4 connects with a line 6 which, in turn, connects with a pump 7 having a delivery line 8 connecting with line 3. Similarly, the effluent end of polymerizer 4a connects with a line 6a leading to a pump 7a having a delivery line 8a which connects with line 3a. Valved lines 9 and 9a branch from the respective lines 6 and 6a and connect with a delivery line 9d leading to a devolatilizer 10. Otherwise, the apparatus of Fig. 2 is similar to that of Fig. 1.

The arrangement of apparatus shown in Fig. 4 is similar to that of Fig. 2, except that the tubular polymerizer 4 and temperature control chamber 5 of Fig. 2 are replaced by a jacketed extruder 15 provided with a feed-worm 16 in Fig. 4, and that the pump 7 of Fig. 2 is replaced by another jacketed extruder 15a which is provided with a feed-worm 16a. The jacket to each of the extruders 15 and 15a is provided with an inlet and outlet for passage of a temperature control fluid through such jacket. The extruders 15 and 15a of Fig. 4 function both as polymerization chambers and as extruders, or pumps, for causing flow of the polymerization mixture.

The apparatus arrangements shown in the drawing may be changed or modified. For instance, in any of the Figs. 1–4, line 3, or line 14, may be provided with a surrounding heating jacket, or other temperature control means, to bring the monomeric material to a temperature approaching the polymerization temperature prior to feed into the polymerization zone. The recirculation lines 3 and 6 may be heat-insulated, or be provided with temperature control jackets for a similar purpose. Also, instead of a single inlet, or the two inlets, 1 and 2, any desired number of such inlets may be provided. In Figs. 2–4, such feed inlets may connect with line 8 at a number of points throughout its length so as to facilitate uniform mixing of the feed material with the material being recycled through line 8. Still other ways in which the apparatus arrangements of the drawing may be modified will be evident.

The method of the invention is substantially the same, regardless of whether it be applied in making a homopolymer or a copolymer and the apparatus of any of the figures of the drawing may be employed in making either such product.

In carrying out the homopolymerization of styrene using the arrangement of apparatus shown in Fig. 1, the vessel 4 is filled, e. g. to three-fourths its capacity or thereabout, with styrene or a solution of styrene and polystyrene. The vessel is heated by passage of a heating fluid, such as water or steam, through the jacket 5. Styrene is fed to the vessel, preferably at a constant rate, through inlet 1. A stream of the polymerization mixture, which is a solution of polystyrene in styrene, is withdrawn through line 9 at a corresponding rate, expressed on a volume basis, and is fed to the devolatilizer 10. In the devolatilizer 10 the stream of the polymerization mixture is heated, preferably under vacuum, to vaporize unreacted styrene therefrom. The styrene vapors pass through line 12 to pump 13 where they are compressed. The styrene is delivered, preferably in liquefied condition, through line 14 to the inlet line 3 and is thus returned to the vessel 4. Polystyrene is delivered from the polymerization system through outlet 11.

During operation, as just described, the stirrer 17 is operated to cause rapid mixing of the inflowing styrene with the polymerization mixture and to facilitate removal of heat generated in the reaction, e. g. by a cooling action of the temperature control fluid flowing through the jacket 4. The temperature of the mixture in vessel 3 is maintained as nearly constant as possible, e. g. it usually varies by not more than 10° C. at different points within the polymerization mixture in vessel 4 and by not more than 5° C. at a given point within the vessel.

It will be noted that the method as just described involves feed of monomeric styrene to the polymerization system and withdrawal of devolatilized polystyrene from the system, i.e. nearly all of the styrene is retained in the system until it is polymerized. As a result, the relative proportions of styrene and polystyrene in vessel 4 usually change gradually during the early stages of operation of the process to approach a condition of balance. Thereafter, the relative proportions of styrene and polystyrene in the polymerization mixture remain nearly constant and the polystyrene which is produced is rich in polymer molecules having molecular weights falling within a fairly narrow range, e. g. the method permits production of polystyrene in a form containing 40 percent by weight or more of polymer molecules having molecular weights falling within a range of 20,000 or smaller. Such polystyrene, upon being heat-plastified and molded, need be cooled in the mold to a less extent for hardening of the same than is required in the molding of polystyrene made by a batch polmerization process.

The process, as described above with reference to the polymerization of styrene in the apparatus of Fig. 1 of the drawing, may be applied directly in copolymerizing two or more vinylidene compounds, e. g. styrene and methyl acrylate. In carrying out such copolymerization, the styrene and methyl acrylate are fed through inlets 1 and 2, respectively to vessel 4 at constant rates and in relative proportions corresponding to the composition of the desired copolymer. The copolymeric product which is obtained possesses a composition corresponding closely to the relative proportions in which the styrene and methyl acrylate are fed to the vessel 4 and is extremely rich in copolymer molecules having a narrow range of molecular weights.

In employing the apparatus of Fig. 2 for making a copolymer of styrene and ar-monochlorostyrene of predetermined and substantially homogeneous composition, e. g. consisting of 75 percent by weight styrene and 25 percent chlorostyrene, the two monomers are fed to the polymerization system through inlets 1 and 2, respectively, in steady flow at rates corresponding to the composition of copolymer desired. The polymerizer 4 is heated to a substantially uniform temperature, e.g. between 80° and 200° C., by passage of a heating fluid such as water, oil, or air through the chamber 5. The temperature range just mentioned is that within which the polymerizations are usually conducted, but lower or higher temperatures can sometimes be used. Pump 7 is operated to cause recycling of a major portion of the polymerization mixture and the valve in line 9 is opened sufficiently to allow flow of a minor portion of the mixture, i.e. a solution of the copolymer in unreacted monomeric material, to the devolatilizer 10. The latter is operated in normal manner, e. g. using pump 13 to create a vacuum and cause vaporization of unconsumed monomers and other volatile materials from the copolymer. The devolatilized copolymer is discharged by means of a vacuum lock discharge means, such as a gear pump, through outlet 11. The volatiles thus removed from the copolymer are compressed, and usually liquefied, by action of pump 13 which forwards them through lines 14 and 3 for return to the polymerizer 4.

After operation of the polymerization system has been fully established, the combined rate of feed of monomers, on a weight per unit of time basis, corresponds approximately to the rate of copolymer withdrawal through outlet 11. The concentration of copolymer in the portion of the polymerization mixture being recycled through line 6, pump 7, and lines 8 and 3 is dependent in part on the ratio between the combined rate of recycling materials, e.g. through said lines and pump and also through line 12, pump 13 and lines 14 and 3, and the combined rate of feed of monomers to the polymerization system. When using the apparatus of Fig 2, this ratio and the other polymerization conditions such as temperature, pump delivery pressures, etc., are usually such that the material being recycled through lines 6, 8 and 3 is mobile and flows readily through the lines. Such recycled material usually contains less than 80 percent, and preferably between 10 and 60 percent, by weight of the copolymer. The above-mentioned ratio between the rate of recycling materials in the system and the rate of feed of monomers to the system is advantageously at least 5/1 and may be as large as desired, e. g. 1000/1 or larger. It is usually between 20/1 and 200/1. The polymerization time, i. e. the average period over which an infinitesimal portion of a monomer of the feed mixture is retained in the system before being copolymerized and discharged as copolymer, is dependent both on the absolute rates of recycle and of feed and upon the ratio between said rates. It is not dependent on the distance of travel involved in a single cycle of operation with the system. Accordingly, a given rate of copolymer production may be obtained using polymerization systems of widely varying sizes, a change in size, or capacity, of such system being compensated by a corresponding change in rates of flow of materials in the system.

By maintaining the polymerization mixture at a substantially constant temperature, e. g. at temperatures not varying by more than 10° C., particularly during travel through polymerizer 4, a copolymer is obtained which is substantially homogeneous both in chemical composition and molecular weight. When a copolymeric product is desired which is nearly uniform in chemical composition, but of non-uniform molecular weight, one or more other tubular polymerizers may be inserted in series with the polymerizer 4 and the several polymerizers be maintained at different temperatures, the mode of operation being otherwise similar to that described above. Instead of having such multiplicity of polymerizers arranged in series, they may advantageously be arranged in parallel, as illustrated in Fig. 3 of the drawing.

Operation with the apparatus of Fig. 3 is similar to that just described for Fig. 2, except that the monomeric feed mixture, after being formed, is divided, with one stream of the same passing to the polymerizer 4 and the other stream flowing to polymerizer 4a. The two polymerizers are preferably operated at different temperatures, e. g. at temperatures differing from one polymerizer to the other by 10° C. or more, so that the copolymer formed in one polymerizer is of a molecular weight different from that formed in the other polymerizer. A major portion of the mixture flowing from each polymerizer is recycled into admixture with the monomeric feed material and returned to the same polymerizer. Minor amounts of the mixtures flowing from the polymerizers are withdrawn, blended together and fed to the devolatilizer 10, where unreacted monomers and other volatile components, if present, are removed by vaporization and returned through line 12, pump 13 and line 14 into admixture with the monomers being fed to the polymerization system as a whole.

It should be mentioned that in making a copolymer, it is essential that the concentration of polymeric material in the mixture being circulated through one of the polymizers be approximately the same as that in the mixture being circulated through the other polymerizer, since otherwise the copolymer being formed in one of the polymerizers may be of composition different from that of the copolymer being formed in the other polymerizer. The same concentration of polymer may be maintained in both of the polymerization mixtures by inserting into the circulatory system for each polymerizer, e. g. in each of the lines 6 and 6a, an element which is responsive to a change in concentration of polymer in the polymerization mixture and which, in turn, activates means for changing the rate of flow of the mixture through the polymerizer so as to cause an increase or decrease in the amount of polymer formed per pass of the mixture through the polymizer and thus bring the concentration of the polymer in the mixture to a desired value. Such responsive elements and control means are well known in the art. Examples of suitable responsive elements are devices for measuring and recording in a continuous manner either the density or the index of refraction of a stream of liquid during flow past a given point, e. g. hydrometers or refractometers. Examples of means for changing a rate of liquid flow which may be actuated by such elements are electrical systems for automatically opening or closing valves, such as those in lines 3 and 3a, or for controlling the rate of operation of pumps, such as the pumps 7 and 7a. The concentration of polymeric material in the mixture, e. g. in polymerizer 4, may be increased either by partially closing the valve in line 3 so as to reduce the rate of flow of monomeric material to the polymerizer, or by reducing the rate of operation of pump 7 so as to reduce the rate of circulation of the polymerization mixture, or by a combination of these operations. When the apparatus of Fig. 3 is employed in making a homopolymer, it is not necessary that the concentration of polymer be the same in the polymerization mixtures within the respective polymerizers 4 and 4a. Accordingly, the above-mentioned known control means are not included in the drawing.

After a copolymerization has been carried out, as just described, in the polymerization system of Fig. 3 for a time sufficient to reach the aforementioned condition of approximate chemical balance, the copolymer being formed in each of the polymerizers 4 and 4a is of a chemical composition corresponding approximately to that of the monomeric feed mixture, but the copolymer being produced in polymerizer 4 is of a molecular weight different from that being produced in polymerizer 4a. The valves in lines 3, 3a, 9 and 9a may be adjusted to regulate the relative amounts of the monomeric feed mixture flowing to the respective polymerizers 4 and 4a and the relative amounts of copolymeric material withdrawn from the respective polymerizers and blended together, and thus control the relative proportions in which the copolymer molecules of different molecular weights are formed and blended together to make up the copolymeric product. The molecular weight of the copolymer formed in either of the polymerizers 4 and 4a is dependent in part on the polymerization temperature and may be brought to a desired value by control of the temperature. In general, the molecular weight of a copolymer being formed becomes lower with rise in the polymerization temperature.

Accordingly, the apparatus of Fig. 3 permits ready production of a copolymeric material of predetermined and substantially uniform chemical composition, but made up of copolymer molecules of varying molecular weights blended together in any desired proportions. If desired, the apparatus of Fig. 3 may be modified by employing three or more polymerizers arranged in parallel, the mode of operation being otherwise similar to that just described.

The apparatus illustrated by Fig. 4 permits operation with polymerization mixtures which are more thick, viscous, or resistant to flow than may conveniently be employed with the apparatus of Figs. 1–3. When using similar kinds and proportions of monomeric starting materials and a similar polymerization temperature, the polymerization mixture employed and recycled in the apparatus of Fig. 4 may be far richer in the copolymer and have a much lower concentration of unreacted monomers (e. g. a monomer concentration of from 1 to 20 percent by weight) than is required when employing the apparatus of Fig. 2 or Fig. 3. Such employment of only a small proportion of monomers in the polymerization mixture limits the proportion of volatiles which must be vaporized and recovered from the copolymer product. Also, the extruders 15 and 15a, which also function as polymerizers, may be operated at the same temperature to produce a copolymer which is exceptionally uniform, both in composition and molecular weight, or at different temperatures to produce a copolymeric material which is of nearly homogenous composition in the sense of containing the monomers chemically combined in approximately the same proportions throughout a body of the same, but which is made up of copolymer molecules of varying molecular weights.

The invention may be applied in making solid, molable, and substantially homogeneous copolymers of predetermined composition from a mixture of any two or more of the polymerizable olefinic compounds hereinbefore mentioned. For instance, it may be applied in making such copolymer from a mixture of styrene and alpha-methylstyrene; a mixture of styrene and ar-chlorostyrene; a mixture of styrene, alpha-methylstyrene and ar-chlorostyrene; a mixture of styrene and ar-ethylvinylbenzene; a mixture of styrene and maleic anhydride; a mixture of ethyl acrylate and methyl methacrylate; or a mixture of styrene, methyl methacrylate and ar-chlorostyrene; etc. The solid copolymers of alkenyl aromatic compounds (having the general formula hereinbefore given) with one another or with other polymerizable vinylidene compounds are of particular interest and constitute a preferred field for application of the invention.

The following examples describe certain ways in which the principle of the invention has been applied, but are not to be construed as limiting its scope.

*Example 1*

Using a polymerization system similar to that illustrated by Fig. 2 of the drawing, styrene and alphamethylstyrence were fed to the system at relative rates corresponding to 6 parts by weight of styrene and 4 parts of alpha-methylstyrene per hour. The polymerizer, 4, was heated to, and maintained at, approximately 120° C. A major portion of the polymerization mixture was recycled through the polymerizer. A minor portion of the effluent mixture from the polymerizer was passed to a devolatilizing device where it was heated to approximately 220° C. at from 8 to 10 millimeters absolute pressure to vaporize volatile components (principally unreacted monomers) therefrom. The volatile materials thus removed from the copolymer were recycled into admixture with the feed of styrene and alpha-methylstyrene and thus returned to the polymerizer. The devolatilized copolymer was extruded in continuous flow from the devolatilizing device and collected. Operation as just described was carried out continuously for 13 days. At 24 hour intervals, the rate of copolymer production was determined and samples of the copolymer being produced were withdrawn for study. The samples thus withdrawn were tested in usual ways to determine the percent by weight of volatile material retained therein, the viscosity in centipoises at room temperature of a solution of 10 percent by weight of the copolymer in toluene, the heat distortion temperature of a molded test piece of the copolymer, and the impact strength and tensile strength of molded test pieces of the copolymer. The procedure in determining the percent of volatile material retained in the copolymeric product was to heat a weighed sample of the product under vacuum at 153° C. and at 1 millimeter absolute pressure for 3 hours and then cool and reweigh. The loss in weight represents the volatile ingredients. The impact strength and tensile strength values were determined, using injection molded test bars of ⅛ by ⅛ inch square cross section, by procedures which, except for the dimensions of the test bars, were similar to those described in ASTM D648–41T. The following table gives the total time, in days after start of the polymerization process, when each sample of copolymer being produced was collected for testing; the rate in pounds per hour of copolymer production at the time of withdrawal of the sample; and the aforementioned properties for each sample of copolymer. There were a few instances in which one or more of the properties were not determined.

TABLE I

| Sampling Time, Days | Production Rate, lbs./hr. | Properties of Copolymer Sample | | | | |
|---|---|---|---|---|---|---|
| | | Volatiles, Percent | Viscosity of Sol'n | Heat Distortion Temp., °C. | Impact Strength, Inch-lbs. | Tensile Strength, lbs./sq. in. |
| 1 | 0.238 | 0.68 | 20 | 100 | 0.32 | 6,910 |
| 2 | 0.202 | 0.57 | 28 | 98 | 0.40 | 7,120 |
| 3 | 0.238 | 0.51 | 20 | 102 | 0.18 | 7,340 |
| 4 | 0.245 | 0.81 | 19 | 102 | 0.18 | 6,500 |
| 5 | 0.210 | 0.61 | 17 | 96 | 0.18 | 6,050 |
| 6 | 0.197 | 0.82 | 17.5 | 99 | 0.20 | |
| 7 | 0.194 | 0.59 | 17.3 | 103 | 0.15 | |
| 8 | 0.194 | 0.53 | 17.7 | 104 | 0.22 | 5,455 |
| 9 | 0.205 | 0.67 | 18.3 | 105 | 0.18 | |
| 10 | 0.208 | 0.74 | 17.0 | 105 | 0.18 | 7,424 |
| 11 | 0.198 | 0.74 | 16.0 | 103 | 0.17 | |
| 12 | 0.186 | 0.58 | 16.0 | 101 | 0.15 | |
| 13 | 0.206 | 0.80 | | 105 | 0.19 | |

As will be evident from the table, most of the physical properties of the copolymer being produced varied considerably in the first 5 to 8 days of operation, but thereafter varied to a relatively small extent. This indicates that from 5 to 8 days of operation were required to bring the continuous polymerization system to a condition approximating a chemical balance so that thereafter a copolymer of nearly uniform composition, and corresponding closely to the composition of the feed mixture, was formed.

*Example 2*

A portion of the copolymer of styrene and alphamethylstyrene, which was collected as the eighth sample in the experiment of Example 1, was dissolved in methyl ethyl ketone and fractionally precipitated by portionwise addition of methyl alcohol to the solution. The fraction of the product precipitated by each such addition of the alcohol was separated from the liquor, dried and analyzed to determine the proportion of alpha-methylstyrene chemically combined therein. The following gives the amount of each fraction of the copolymer (expressed as percent of the weight of the copolymer initially dissolved in the methyl ethyl ketone) and the percent by weight of alpha-methylstyrene chemically combined in each such fraction.

TABLE II

| Fraction No. | Percent of Wt. of Sample | Percent of Alpha-Methyl-Styrene in Copolymer Fraction |
|---|---|---|
| 1 | 53 | 37.1 |
| 2 | 5.4 | 38.3 |
| 3 | 7.9 | 37.7 |
| 4 | 10.2 | 38.8 |
| 5 | 4.6 | 37.9 |
| 6 | 7.4 | 37.4 |
| 7 | 5.4 | 36.4 |

Attempts to make copolymers similar to that just described by a batchwise polymerization method failed. When a solution of 3 parts by weight of styrene and 2 parts of alpha-methylstyrene is heated in a closed vessel and in batchwise manner, the styrene copolymerizes most rapidly and is consumed when only about half of the alpha-methylstyrene has reacted. Also, such batchwise polymerization results in formation of a mixture of copolymers of widely varying chemical composition and not in a copolymer of substantially uniform composition such as that obtained above by the method of the invention.

*Example 3*

The experiment of Example 1 was repeated, except that polymerization temperature was 110° C. and the relative rates of feed of the monomers corresponded to 80 parts by weight of styrene and 20 parts of alphamethylstyrene per hour. The copolymer being formed after several days of operation was of a composition corresponding to that of the feed mixture. When the system had been operated continuously for about 16 days, i. e. for a time sufficient to assure reaching a condition of approximate balance, samples of the copolymer being produced were collected at 24 hour intervals and tested for determination of properties, as in Example 1. Table III gives the properties of each sample.

TABLE III

| Sample No. | Properties | | | | |
|---|---|---|---|---|---|
| | Volatiles, percent | Viscosity of Sol'n. | Heat Distortion Temp., °C. | Impact Strength, Inch-lbs. | Tensile Strength, lbs./sq. in. |
| 1 | 0.32 | 28 | 98 | 0.59 | 6,780 |
| 2 | 0.30 | 27 | 98 | 0.43 | 6,690 |
| 3 | 0.32 | 27 | 98 | 0.43 | 6,690 |

*Example 4*

This example illustrates certain of the differences between the properties of a copolymer prepared in accordance with the invention from a feed mixture consisting of 80 percent by weight methyl acrylate and 20 percent styrene and the properties of a polymeric body prepared by a batchwise polymerization of the same starting materials in the same relative proportions. In the batchwise polymerization, which is outside the scope of the invention, a bomb was charged with 80 parts by weight of methyl acrylate and 20 parts of styrene. The bomb was then closed and heated at 110° C. for 48 hours and thereafter at 160° C. for 24 hours so as to assure substantial completion of the polymerization reaction. The bomb was then cooled, opened and the polymeric product was removed. The product was an opaque white solid body containing less than 5 percent by weight of unreacted monomeric material, i. e. it was at least 95 percent polymerized. The product was ground into particles suitable for molding and was compression molded into thin disks, e. g. of about 1/64 inch thickness, which permitted better examination of the product. These disks of the product were translucent and of a mottled appearance, i. e. a face of such disk comprised blots of at least two different, incompatible, polymeric materials of widely different appearance. Certain of the blots were more nearly transparent than others. The blots were of sizes ranging from about 1/16 to about 1/4 inch in diameter.

In the experiment which was carried out in accordance with the invention, a mixture of 80 parts by weight of methyl acrylate and 20 parts of styrene was fed as a stream to a circulatory polymerization system similar to that shown schematically in Fig. 2 of the drawing. The liquid capacity of the system, i. e. the total capacity of the lines 4, 6 and 8 and the pump 7 of Fig. 2 of the drawing, was approximately 1.9 liters. Said lines and pump were filled with the mixture and liquid flowed from line 6 through line 9. The rate of feed of the solution of methyl acrylate and styrene to the system was approximately 57 cubic centimeters per hour. During continued feed of the monomer mixture to the system, material in the polymerization zone (shown as line 4 in Fig. 2 of the drawing) was heated at a polymerization temperature of approximately 110° C. and the polymerization mixture was circulated rapidly, i. e. at a rate of about 900 liters per hour, through the above-mentioned lines 4, 6, 8 and pump 7. Material flowing from this circulatory portion of the system through line 9 was fed to a devolatilizer where it was heated under vacuum to vaporize and recover unreacted monomeric material therefrom. The recovered monomeric material was returned in continuous manner to the polymerization zone, e. g. through the line 12, pump 13 and line 14 shown in Fig. 2. The polymeric product remaining after the vaporization of monomeric material therefrom, was delivered in a continuous manner from the devolatilizer. The polymerization was carried out continuously, as just described, for a period of 100 hours so as to bring the system into a condition of balance. A sample of the polymeric material being produced was then withdrawn and examined. It was a transparent, slightly opalescent, practically colorless, solid copolymer of approximately 80 percent by weight methyl acrylate and 20 percent styrene. It was ground to form granules suitable for molding and then molded into thin disks, e. g. of about 1/64 inch thickness. The disks were clear, colorless, transparent and of uniform appearance throughout.

*Example 5*

Styrene alone was polymerized in continuous manner at a polymerization temperature of 120° C. by procedure otherwise similar to that described in Example 1. After operating the system for sufficient time to bring it to a condition of approximate balance, i. e. for about four days, a sample of the polystyrene being produced was tested to determine its properties. It was a clear, colorless, transparent, solid material having a tensile strength of 8,260 pounds per square inch of cross section of the test piece and a heat distortion value of 86° C. It was similar to ordinary polystyrene of a molding quality which has been made by a batchwise polymerization procedure, except that during injection molding it could be ejected from the mold without becoming distorted or marred while it was quite hot, e. g. at about 85° C., whereas more extensive cooling of the mold and its contents is required for ejection of ordinary polystyrene from the mold without occurrence of distortion. This unique molding characteristic of polystyrene produced in accordance with the invention is attributed to the product consisting for the most part of polystyrene molecules of close to the same molecular weight.

Other modes of applying the principle of the invention may be employed instead of those explained, change being made as regards the method herein disclosed, provided the step or steps stated by any of the following claims, or the equivalent of such stated step or steps be employed.

I therefore particularly point out and distinctly claim as my invention:

1. A method for the copolymerization of vinylidene compounds in a continuous manner which comprises feeding at least two copolymerizable liquid monomeric vinylidene compounds to a polymerization zone where the resulting mixture is agitated at a polymerization temperature with resultant formation of a mixture of copolymeric material and unreacted monomeric material, withdrawing a stream of the incompletely polymerized mixture from said zone, vaporizing the unreacted monomeric material from the stream and returning it, within the polymerization system, to the polymerization zone, and discharging the residual copolymeric material from the polymerization system at a rate corresponding approximately, on a weight basis, to the rate of monomer fed to the system and, while continuing said operations, maintaining the mixture at each point within the polymerization zone at a substantially constant temperature and feeding monomeric material to the mixture at a rate sufficient to prevent the mixture from becoming completely polymerized, the ratio of one monomer to another in the feed to the polymerization system being maintained substantially constant, whereby the copolymer being formed in early stages of the process is caused, by the above-stated operations, to vary and approach that of a copolymer of the monomers in the proportions in which the latter are being fed from an external source to the polymerization system and thereafter to remain substantially constant.

2. In a method wherein a non-aqueous mixture of vinylidene compounds, capable of being polymerized by the action of heat to form solid moldable copolymers, is polymerized, the steps of carrying out the polymerization in continuous manner to form a copolymer of predetermined and substantially homogeneous composition by feeding the liquid monomers from an external source to a polymerization zone at relative rates corresponding approximately to the composition of the copolymer desired, heating the non-aqueous mixture in said zone at a polymerization temperature, passing the mixture through said zone at a rate preventing complete consumption of any of the monomers in the mixture, recycling a major portion of the effluent mixture to said zone, withdrawing a minor portion of said effluent mixture and vaporizing the volatile ingredients therefrom to obtain the copolymer as a residue, liquefying the volatile ingredients thus vaporized from the copolymer and recycling them within the polymerization system to the polymerization zone, whereby the composition of the copolymer being formed is caused to change during early stages of the process, and continuing the operations just described beyond a point at which there is established, in the polymerization system, a condition approximating a chemical balance such that the relative proportions of the monomeric starting materials chemically combined in the copolymer being produced corresponds closely to the proportions in which said monomers are being fed to the polymerization system.

3. A method for polymerizing monomeric vinylidene compounds in a continuous manner which comprises feeding at least two copolymerizable liquid monomeric vinylidene compounds from an external source to a polymerization system comprising a plurality of polymerization zones, heating the material in the different zones to different polymerization temperatures, while maintaining the material in each such zone at a substantially constant temperature, combining the streams of the polymerization mixtures flowing from the different polymerization zones, vaporizing unreacted monomeric material from the combined effluent stream and returning it into admixture with the monomeric material being fed from an external source to the several polymerization zones, and discharging from the polymerization system the polymeric product which remains after the vaporization of monomeric material from the combined effluent stream of the polymerization mixture, the monomers being fed to the polymerization system in a substantially constant ratio corresponding to that in which the monomers are to be combined with one another to form a desired copolymer, whereby the copolymer which is being formed in each of the polymerization zones is caused, by the above-stated operations, to vary in early stages of the process and approach that of the copolymer of the monomers in the proportions in which the latter are being fed from an external source to the polymerization system and thereafter to remain substantially constant.

4. A method for polymerizing in a continuous manner a mixture of heat-polymerizable vinylidene compounds to form a copolymer of predetermined and substantially homogeneous composition, which method comprises feeding the monomers from an external source to a polymerization system at relative rates corresponding approximately to the composition of the desired copolymer, agitating and heating the mixture in said zone to partially polymerize the mixture and, while continuing these operations, withdrawing a stream of the partially polymerized mixtures from said zone at a rate such that the weight of polymeric material withdrawn per hour in the stream corresponds approximately to the combined weight of the monomers being fed per hour from an external source to the polymerization system, vaporizing unreacted monomeric material from the stream of partially polymerized material which is being withdrawn, thus obtaining the copolymer as a residue, and returning the recovered monomeric material, within the system, to the polymerization zone, whereby the composition of the copolymer being formed is caused to vary in early stages of the process to approach that of a copolymer of the monomers in the proportions in which the latter are being fed from an external source to the polymerization system and thereafter to remain substantially constant.

5. In a method wherein a mixture of vinylidine compounds, capable of being polymerized by the action of heat to form solid moldable copolymers, is polymerized, the steps of carrying out the polymerization in continuous manner to form a copolymer of predetermined and substantially homogeneous composition by feeding the liquid monomers to a polymerization zone at relative rates corresponding approximately to the composition of copolymer desired, heating the mixture in said zone at a polymerization temperature, passing the mixture through said zone at a rate preventing complete consumption of any of the monomers in the mixture, recycling a major portion of the effluent mixture to said zone, withdrawing a minor portion of said effluent mixture and vaporizing the volatile ingredients therefrom to obtain the copolymer as a residue, liquefying the volatile ingredients thus vaporized from the copolymer and recycling them to the polymerization zone, whereby the composition of the copolymer being formed is caused to change during early stages of the process, and continuing the operations just described beyond a point at which there is established, in the polymerization system, a condition approximating a chemical balance such that the relative proportions of the monomeric starting materials chemically combined in the copolymer being produced corresponds closely to the proportions in which said monomers are being fed to the polymerization system.

6. A method, as described in claim 5, wherein the reaction temperature within the polymerization zone is maintained substantially constant.

7. A method, as described in claim 5, wherein the temperature of the polymerization mixture is varied during passage through the polymerization zone.

8. A method, as described in claim 5, wherein the copolymerization reaction is carried out in the substantial absence of a liquid diluent for the polymerizable compounds.

9. A method, as described in claim 5, wherein the mixture of polymerizable compounds employed as starting materials comprises, as its major component, at least one alkenyl aromatic compound having the general formula:

wherein Ar represents an aromatic radical of the group consisting of aromatic hydrocarbon radicals and nuclear halogenated aromatic hydrocarbon radicals and X represents a member of the group consisting of hydrogen and alkyl radicals containing less than 3 carbon atoms.

10. A method, as described in claim 5, wherein the polymerization is carried out in the substantial absence of a liquid diluent for the polymerizable compounds, the feed mixture of polymerizable vinylidene compounds comprises at least one alkenyl aromatic compound having the general formula:

wherein Ar represents an aromatic radical of the group consisting of aromatic hydrocarbon radicals and nuclear halogenated aromatic hydrocarbon radicals and X represents a member of the group consisting of hydrogen and alkyl radicals containing less than 3 carbon atoms, and wherein the polymerization temperature is maintained substantially constant throughout a major part of the polymerization period.

11. A method, as described in claim 5, wherein the polymerization is carried out in the substantial absence of a liquid diluent for the polymerizable compounds, the feed mixture of polymerizable vinylidene compounds comprises at least one alkenyl aromatic compound having the general formula:

wherein Ar represents a member of the group consisting of aromatic hydrocarbon radicals and nuclear halogenated aromatic hydrocarbon radicals and X represents a member of the group consisting of hydrogen and alkyl radicals containing less than 3 carbon atoms, and wherein the temperature of the reaction mixture is varied during passage through the polymerization zone.

12. In a method wherein a mixture of styrene and alpha-methylstyrene is polymerized to form a solid, moldable copolymer, the steps of carrying out the polymerization in continuous manner to form a copolymer of predetermined and substantially homogeneous composition by feeding the liquid monomers from an external source to a polymerization zone at relative rates corresponding approximately to the composition of copolymer desired, heating the mixture in said zone at a polymerization temperature, passing the mixture through said zone at a rate preventing complete consumption of either of the monomers in the mixture, recycling a major portion of the effluent mixture to said zone, withdrawing a minor portion of said effluent mixture and vaporizing the volatile ingredients therefrom to obtain the copolymer as a residue, liquefying the volatile ingredients thus vaporized from the copolymer and recycling them to the polymerization zone, whereby the composition of the copolymer being formed is caused to change during early stages of the process, and continuing the operations just described beyond a point at which there is established, in the polymerization system, a condition approximating a chemical balance such that the relative proportions of styrene and alpha-methylstyrene chemically combined in the copolymer being produced corresponds closely to the proportions in which the styrene and alpha-methylstyrene are being fed to the polymerization system.

13. In a method wherein a mixture of styrene and methylacrylate is polymerized to form a solid, moldable copolymer, the steps of carrying out the polymerization in continuous manner to form a copolymer of predetermined and substantially homogeneous composition by feeding the liquid monomers from an external source to a polymerization zone at relative rates corresponding approximately to the composition of copolymer desired, heating the mixture in said zone at a polymerization temperature, passing the mixture through said zone at a rate preventing complete consumption of either of the monomers in the mixture, recycling a major portion of said effluent mixture, withdrawing a minor portion of said effluent mixture and vaporizing the volatile ingredients therefrom to obtain the copolymer as a residue, liquefying the volatile ingredients thus vaporized from the copolymer and recycling them to the polymerization zone, whereby the composition of the copolymer being formed is caused to change during early stages of the process, and continuing the operations just described beyond a point at which there is established, in the polymerization system, a condition approximating a chemical balance such that the relative proportions of styrene and methylacrylate chemically combined in the copolymer being produced corresponds closely to the proportions in which the styrene and methylacrylate are being fed to the polymerization system.

References Cited in the file of this patent

UNITED STATES PATENTS

| | | |
|---|---|---|
| 2,390,437 | Hayes | Dec. 4, 1945 |
| 2,420,330 | Shriver et al. | May 13, 1947 |
| 2,537,031 | Chaney | Jan. 9, 1951 |